United States Patent
Shimizu (10) Patent No.: US 12,120,993 B2
(45) Date of Patent: Oct. 22, 2024

(54) RECIPROCATING CUTTING BLADE APPARATUS

(71) Applicant: YAMABIKO CORPORATION, Tokyo (JP)

(72) Inventor: Kunio Shimizu, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 315 days.

(21) Appl. No.: 17/531,904

(22) Filed: Nov. 22, 2021

(65) Prior Publication Data

US 2022/0078977 A1 Mar. 17, 2022
US 2022/0400618 A9 Dec. 22, 2022

Related U.S. Application Data

(63) Continuation of application No. PCT/JP2020/019667, filed on May 18, 2020.

(30) Foreign Application Priority Data

Jun. 28, 2019 (JP) ................................ 2019-121832

(51) Int. Cl.
*A01G 3/053* (2006.01)
*A01G 3/04* (2006.01)

(52) U.S. Cl.
CPC ...... *A01G 3/053* (2013.01); *A01G 2003/0461* (2013.01)

(58) Field of Classification Search
CPC ...... A01G 3/047; A01G 3/0475; A01G 3/053; A01G 3/0535; A01G 2003/0461
(Continued)

(56) References Cited

U.S. PATENT DOCUMENTS 1,294,989 A * 2/1919 Wilcox ............... B21K 1/46
   470/11
2,779,375 A * 1/1957 O'Connor ......... F16B 39/26
   411/959
(Continued)

FOREIGN PATENT DOCUMENTS

CN 1609464 A 4/2005
CN 105972021 A 9/2016
(Continued)

OTHER PUBLICATIONS

International Search Report cited in International Application PCT/JP2020/019667 filed May 18, 2020.
(Continued)

*Primary Examiner* — Adam J Eiseman
*Assistant Examiner* — Richard D Crosby, Jr.
(74) *Attorney, Agent, or Firm* — BACON&THOMAS,PLLC (57) ABSTRACT

The reciprocating cutting blade apparatus includes: a pair of reciprocating cutting blades disposed to overlap one another in a thickness direction; a support member configured to reciprocably support the reciprocating cutting blades in a longitudinal direction; and an adjustment mechanism configured to adjust a gap between the reciprocating cutting blades on a lower surface side of the support member. The adjustment mechanism includes: a screw hole provided in the support member; an adjustment screw including an external thread configured to threadedly engage with the screw hole through long holes provided in the reciprocating cutting blades; and a nut configured to threadedly engage with the external thread protruding from an upper surface of the support member to fix the external thread to the support member. The external thread protruding from the upper
(Continued)

surface of the support member includes an operated portion configured to be operated to turn the adjustment screw.

5 Claims, 6 Drawing Sheets

(58) Field of Classification Search
USPC .................................................. 411/388–389
See application file for complete search history.

(56) References Cited

U.S. PATENT DOCUMENTS

| | | | | |
|---|---|---|---|---|
| 3,218,906 | A * | 11/1965 | Dupree | F16B 41/002 411/533 |
| 4,587,377 | A * | 5/1986 | Rodseth | H05K 7/20509 411/533 |
| 5,020,951 | A * | 6/1991 | Smith | F16B 35/041 411/533 |
| 5,267,820 | A * | 12/1993 | Sturtevant | B60R 13/01 411/551 |
| 5,380,136 | A * | 1/1995 | Copple | F16B 37/044 411/113 |
| 5,688,091 | A * | 11/1997 | McKinlay | F16B 39/282 411/533 |
| 5,934,851 | A * | 8/1999 | Stewart | B21K 25/00 411/113 |
| 5,964,560 | A * | 10/1999 | Henriksen | F16B 25/0031 411/404 |
| 6,102,610 | A * | 8/2000 | Palusis | F23R 3/007 403/220 |
| 6,186,718 | B1 * | 2/2001 | Fogard | F16B 23/0038 81/436 |
| 6,623,226 | B2 * | 9/2003 | Braun | F16B 41/002 411/970 |
| 6,908,276 | B2 * | 6/2005 | Dohm | F16B 43/00 411/533 |
| 6,988,432 | B2 * | 1/2006 | Brooks | B25B 15/008 411/407 |
| 7,192,234 | B2 * | 3/2007 | Anderson | F16B 37/044 411/338 |
| 7,207,248 | B2 * | 4/2007 | Panasik | F16B 23/0092 81/460 |
| 7,406,770 | B2 * | 8/2008 | Mace | A01D 34/14 83/837 |
| 7,581,913 | B2 * | 9/2009 | Ordonio, Jr. | F16B 37/14 411/533 |
| 8,028,423 | B2 * | 10/2011 | Matsuo | A01G 3/053 30/220 |
| 8,142,126 | B2 * | 3/2012 | Porter | B64C 1/26 411/199 |
| 8,753,227 | B1 * | 6/2014 | Cackett | A63B 53/06 411/397 |
| 8,974,164 | B2 * | 3/2015 | Benedetti | F16B 41/002 411/432 |
| 10,302,119 | B2 * | 5/2019 | Lares | F16B 23/0038 |
| 10,321,636 | B2 * | 6/2019 | Peterson | A01G 3/053 |
| 10,537,069 | B2 * | 1/2020 | Wykman | A01G 3/04 |
| 10,619,344 | B1 * | 4/2020 | Taneichi | F16B 37/04 |
| 11,432,467 | B2 * | 9/2022 | Shimizu | A01G 3/047 |
| 2002/0182031 | A1 * | 12/2002 | Anderson | F16B 43/00 411/533 |
| 2013/0209193 | A1 * | 8/2013 | Doye | F16B 35/06 411/166 |
| 2014/0169912 | A1 * | 6/2014 | Sutterluetti | F16B 35/041 411/389 |
| 2018/0206410 | A1 * | 7/2018 | Liu | A01G 3/053 |
| 2020/0404858 | A1 * | 12/2020 | Shimizu | A01G 3/053 |
| 2021/0029887 | A1 * | 2/2021 | Shimizu | A01D 34/135 |
| 2021/0195845 | A1 * | 7/2021 | Sunazuka | A01G 3/053 |

FOREIGN PATENT DOCUMENTS

| | | |
|---|---|---|
| DE | 29613925 U1 | 10/1996 |
| EP | 3267784 A | 1/2018 |
| JP | 53-87237 | 7/1978 |
| JP | 2003-319713 A | 11/2003 |
| JP | 2008-136370 A | 6/2008 |
| JP | 2012-50414 A | 3/2012 |
| JP | 2016-49082 | 4/2016 |

OTHER PUBLICATIONS

English Translation of ISR (PCT/ISA/210 second sheet).
English Translation of Written Opinion of the ISA (PCT/ISA/237).
Office Action issued in corresponding Appln. No. 202080037946.9. along with English translation.
EESR in corresponding International Appln. No. PCT/2020/019667 dated Sep. 23, 2022.

* cited by examiner

RECIPROCATING CUTTING BLADE APPARATUS

CROSS-REFERENCE TO RELATED APPLICATIONS

The present application is a continuation application of PCT International Application No. PCT/JP2020/019667 filed on May 18, 2020 and claims priority from Japanese Patent Application No. 2019-121832 filed on Jun. 28, 2019, and the entire contents of which are hereby incorporated by reference.

TECHNICAL FIELD

The present invention relates to a reciprocating cutting blade apparatus.

BACKGROUND ART

There has been generally known a trimer such as a hedge trimmer for cutting or clipping branches and leaves, which is equipped with a reciprocating cutting blade apparatus having reciprocating cutting blades, like a hair clipper (see Japanese Patent Application Laid-Open No. 2008-136370). The entire contents of this disclosure are hereby incorporated by reference.

Here, a reciprocating cutting blade has an advantage over a rotary cutter or a nylon cutter used in a common brush cutter in that it produces little scattering substances during the work. Therefore, there has been proposed a brush cutter with this advantage of the reciprocating cutting blade, which is equipped with a reciprocating cutting blade apparatus mounted to the top end of a handheld operating rod to perform mowing on the ground (see Japanese Patent Application Laid-Open No. 2016-49082). The entire contents of this disclosure are hereby incorporated by reference.

The above-described reciprocating cutting blades includes two cutters each of which includes a base like a flat plate extending in the longitudinal direction and a plurality of teeth protruding from the base in a direction intersecting the longitudinal direction. These two cutters are stacked in the thickness direction to constitute a pair of reciprocating cutting blades. Then, the pair of reciprocating cutting blades slides on a contact surface and reciprocates in the longitudinal direction to apply cutting action to an object sandwiched between the teeth of one cutter and those of the other cutter.

The gap between the two cutters significantly affects the cutting performance (sharpness) of the reciprocating cutting blades. In order to keep the sharpness of the cutting blades in a good condition, the size of the gap between the two cutters needs to be correctly adjusted. After having been used for a certain period of time, the cutters are worn away and the gap between two cutters is increased, and therefore the sharpness becomes dull. The conventional reciprocating cutting blade apparatus includes an adjustment mechanism capable of adjusting the gap between two cutters in order to recover the sharpness of the worn cutters of the cutting blades (see Japanese Patent Application Laid-Open No. 2008-136370).

SUMMARY OF INVENTION

The reciprocating cutting blade apparatus according to the invention includes: a pair of reciprocating cutting blades disposed to overlap one another in a thickness direction; a support member configured to reciprocably support the reciprocating cutting blades in a longitudinal direction; and an adjustment mechanism configured to adjust a gap between the reciprocating cutting blades on a lower surface side of the support member. The adjustment mechanism includes: a screw hole provided in the support member; an adjustment screw including an external thread configured to threadedly engage with the screw hole through long holes provided in the reciprocating cutting blades; and a nut configured to threadedly engage with the external thread protruding from an upper surface of the support member to fix the external thread to the support member. The external thread protruding from the upper surface of the support member includes an operated portion configured to be operated to turn the adjustment screw.

DESCRIPTION OF EMBODIMENTS

The conventional adjustment mechanism has a structure where two stacked cutters are slidably supported on the lower surface side of a support plate. External threads of adjustment screws penetrating washers and long holes of two cutters are threadedly engaged with internal threads provided in the support plate, and the two cutters are disposed between the washers and the support plate. In this state, the gap between the two cutters is adjusted by adjusting the degree of screwing of the adjustment screws. Then, nuts are threadedly engaged with the external threads of the adjustment screws protruding from the upper surface of the support plate to fix the external threads to the support plate. By this means, the adjusted gap is kept.

When the gap between two cutters is adjusted by this adjustment mechanism, the worker first loosens the nuts on the upper surface of the support plate, and fastens the adjustment screws (tightens the bolts) under the two cutters. Then, the worker loosens the adjustment screws for a half-turn from below the two cutters in order to form an appropriate gap between the two cutters. By this means, the appropriate gap is obtained, and then the adjustment screws are held not to turn by a tool from below the two cutters and the nuts on the upper surface of the support plate are fastened, so that the adjusted gap is fixed.

In this way, the worker adjusting the gap fastens and loosens the nuts on the upper surface of the support plate, and fastens the adjustment screws under the two cutters, and therefore needs to use the hands over and under the cutters, respectively, while alternately looking at the upper side and the lower side of the cutters. Consequently, the worker is required to work, taking into attention the contact with the cutters, and this causes a problem with the adjustment work becoming complex.

The present invention is proposed to address the above-described problem, and it is therefore an object of the invention to provide an adjustment mechanism capable of easily adjust the gap between two cutters of the reciprocating cutting blade apparatus.

Hereinafter, an embodiment of the present invention will be described with reference to the drawings. The same reference numbers in the different drawings indicate the same functional parts, and therefore repeated description for each of the drawings is omitted.

Figure 1:
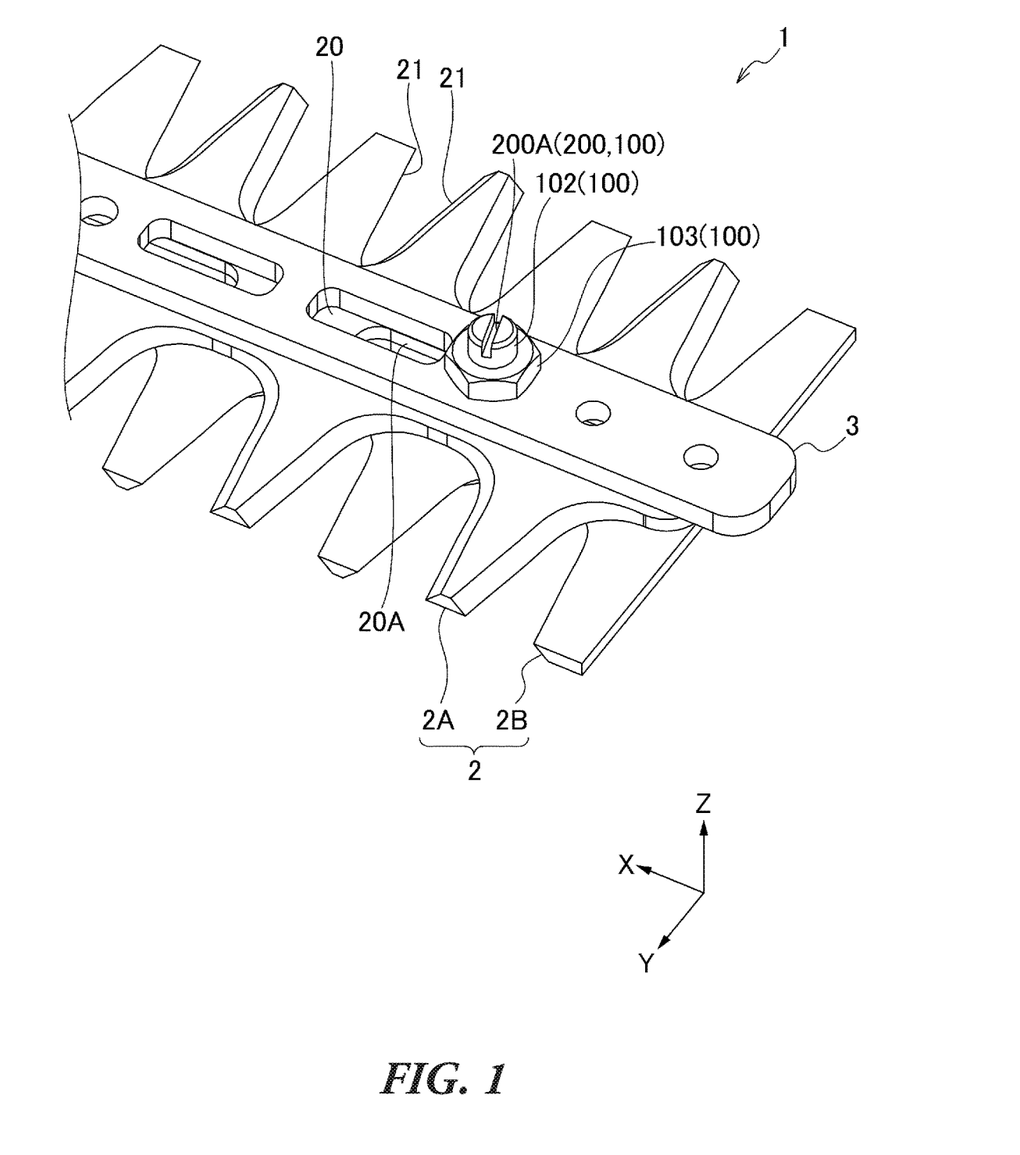
FIG. 1 illustrates essential parts of a reciprocating cutting blade apparatus according to an embodiment of the invention.
Figure 2:
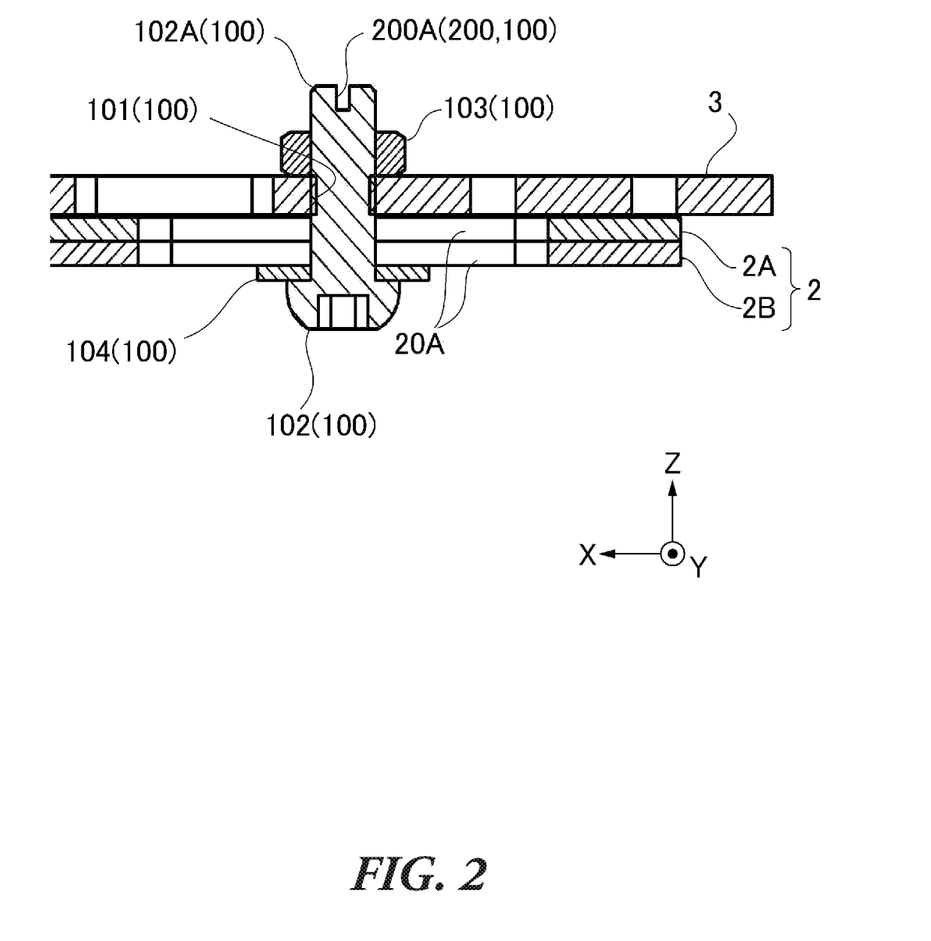
FIG. 2 is a cross-sectional view illustrating the essential parts of the reciprocating cutting blade apparatus according to an embodiment of the invention.

FIG. 1 and FIG. 2 illustrate essential parts of a reciprocating cutting blade apparatus of the present invention. A reciprocating cutting blade apparatus 1 includes a pair of reciprocating cutting blades (hereinafter referred to as simply "cutting blades") 2 disposed to overlap one another in the thickness direction; a support member 3 configured to reciprocably support the cutting blades 2 in the longitudinal direction; and an adjustment mechanism 100 configured to adjust the gap between the pair of cutting blades 2 on the lower surface side of the support member 3.

The cutting blades 2 include two cutters 2A and 2B which are made of metallic plates and overlap one another in the thickness direction (Z direction in the drawings). Each of the cutters 2A and 2B of the cutting blades 2 includes a base 20 like a flat plate extending in the longitudinal direction (X direction in the drawings) and a plurality of teeth 21 protruding in the direction (Y direction in the drawings) intersecting the longitudinal direction.

The base 20 of each of the cutters 2A and 2B is supported by the support member 3, and includes a plurality of long holes 20A provided along the longitudinal direction (the X direction) of the cutting blades 2. The teeth 21 may be provided on both sides of the cutters 2A and 2B as illustrated, or one side in the Y direction. These teeth 21 are like comb-like cutters of a hair clipper. The two cutters 2A and 2B slide relative to one another in the longitudinal direction to apply cutting action to the plants and so forth between the teeth 21 of the cutter 2A and those of the cutter 2B.

The support member 3 movably supports the bases 20 of the pair of cutting blades 2 (cutters 2A and 2B) in the longitudinal direction (the X direction). This support member 3 is a plate-like member disposed along the longitudinal direction of the cutting blades 2. The single support member 3 may support the pair of cutting blades 2, or two plate-like support members 3 may sandwich the bases 20 to support the pair of cutting blades 2. The adjustment mechanism 100 adjusts the gap between the pair of cutting blades 2 on the lower surface side of the support member 3. Each of the cutters 2A and 2B is a thin plate member which does not have stiffness of cutter, but the two cutters 2A and 2B overlap one another thereby to provide the stiffness of cutter. In this case, the gap between the cutters 2A and 2B is required at some level to reduce the sliding friction during the reciprocation, but the gap increasing more than required causes the cutting performance (sharpness) to deteriorate.

As the cutting blades 2 are repeatedly used, not only the teeth 21 but also the bases 20 and upper and lower support plates 3A and 3B are worn, and therefore the gap between the cutters 2A and 2B is increased, so that the sharpness becomes dull. Accordingly, the adjustment of the gap between the two cutters 2A and 2B is important to maintain the sharpness of the cutting blades 2. When the sharpness of the cutters 2A and 2B becomes dull, the adjustment mechanism 100 adjusts the distance between the cutters 2A and 2B to an appropriate value to recover the sharpness.

The adjustment mechanism 100 includes a screw hole 101 provided in the support member 3; an adjustment screw 102 including an external thread 102A configured to threadedly engage with the screw hole 101 through long holes 20A provided in the cutting blades 2; and a nut 103 configured to threadedly engage with the external thread 102A protruding from the upper surface of the support member 3 to fix the external thread 102A to the support member 3.

In addition, the adjustment mechanism 100 includes an operated portion 200 in the external thread 102A protruding from the upper surface of the support member 3. The operated portion 200 is configured to be operated to turn the adjustment screw 102. In the example illustrated in FIG. 1 and FIG. 2, the operated portion 200 includes a slotted portion 200A formed in a top portion of the external thread 102A. The adjustment screw 102 can be operated on the upper surface side of the support member 3 by engaging the slotted portion 200A with a tool such as a flat-cutter screwdriver.

In the example illustrated, the adjustment screw 102 is passed through the longs holes 20A via a washer 104 from below the cutting blades 2, and the external thread 102A of the adjustment screw 102 is threadedly engaged with the screw hole 101 of the support member 3. In this state, the adjustment mechanism 100 adjusts the distance between the washer 104 and the support member 3 to adjust the gap between the cutters 2A and 2B.

When the gap between the cutters 2A and 2B is adjusted by the adjustment mechanism 100 as described above, first the tool is engaged with the operated portion 200 of the adjustment screw 102 from above the support member 3 to prevent the adjustment screw 102 from turning, and the nut 103 on the upper surface side of the support member 3 is loosened. Then, the adjustment screw 102 is turned by the tool engaged with the operated portion 200 from above the support member 3 to adjust the gap. Finally, the nut 103 on the upper side of the support member 3 is fastened while the tool engaged with the operated portion 200 prevents the adjustment screw 102 from turning from above the support member 3, so that the adjustment screw 102 is fixed to the support member 3.

With the adjustment mechanism 100 as described above, the worker does not need to reach for the lower surface side of the cutters 2A and 2B to operate the adjustment screw 102, and can adjust the gap, while looking at only the upper surface side of the cutting blades 2. By this means, it is possible to easily and safely adjust the gap between the cutters 2A and 2B.

Figure 3:
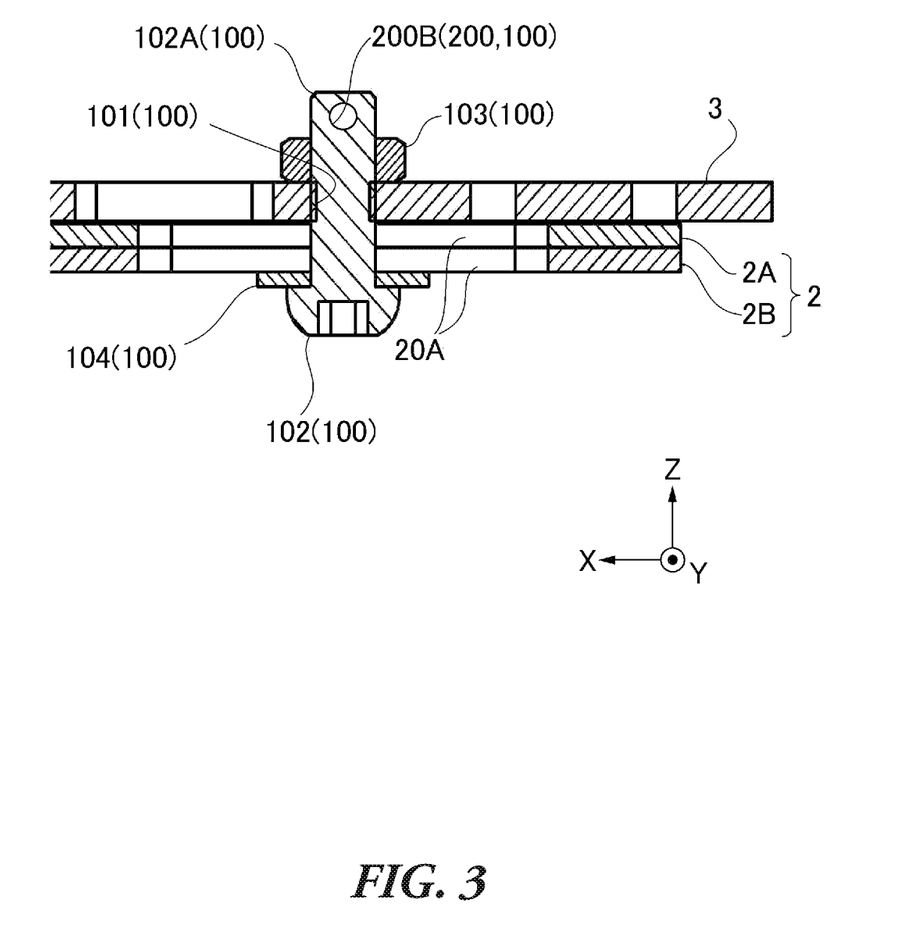
FIG. 3 is a cross-sectional view illustrating the essential parts of the reciprocating cutting blade apparatus according to another embodiment of the invention.

FIG. 3 illustrates the operated portion 200 of the adjustment mechanism 100 according to another embodiment. In this example, the operated portion 200 includes a hole 200B provided in an upper end portion of the external thread 102A of the adjustment screw 102. A tool like a pin is inserted into the hole 200B to operate the adjustment screw 102 in the same way as the example described above. By this means, the worker can perform the adjustment, while looking at only the upper surface side of the cutting blades 2, and consequently easily and safely adjust the gap between the cutters 2A and 2B.

Figure 4:
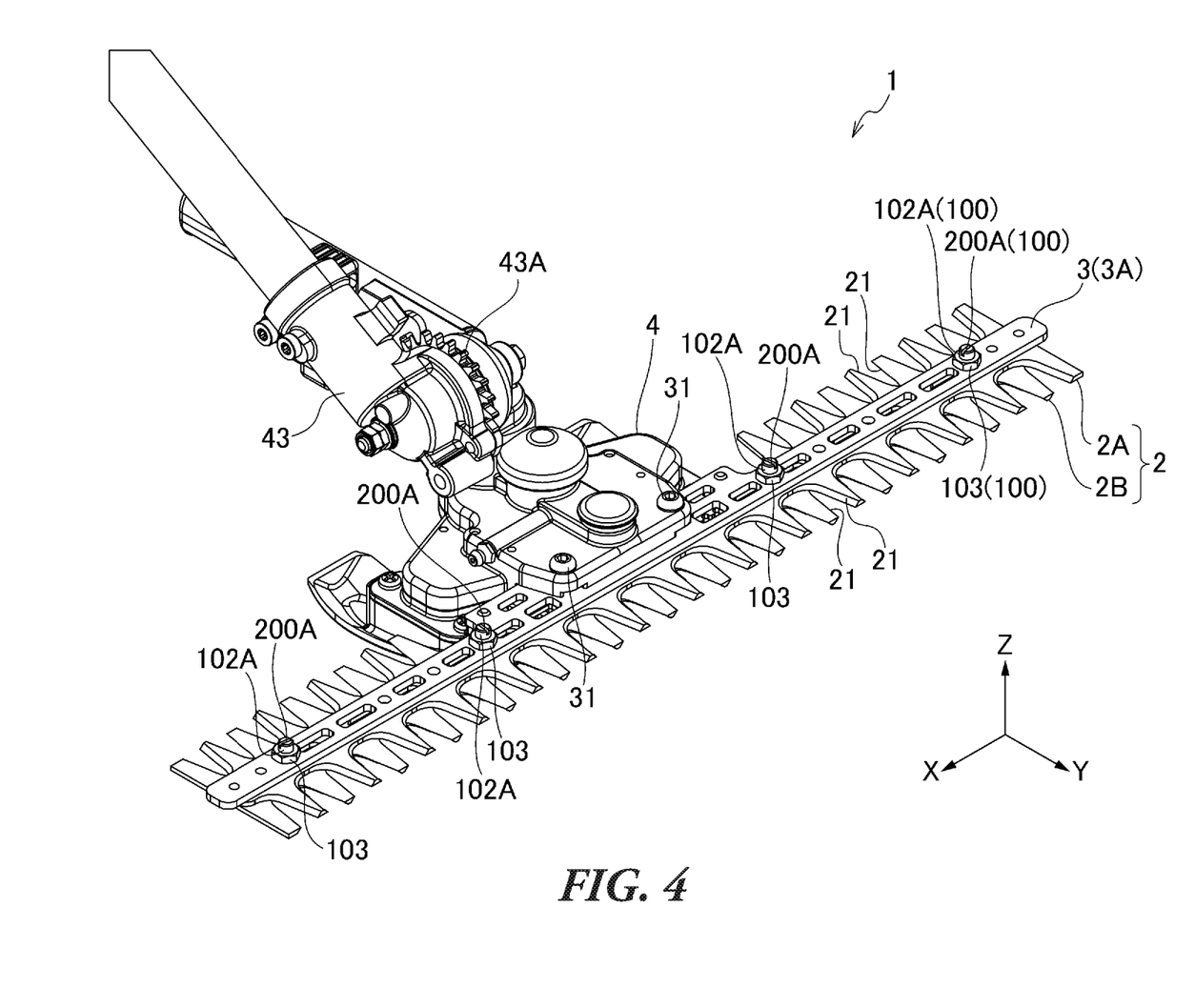
FIG. 4 is an external perspective view illustrating the reciprocating cutting blade apparatus according to an embodiment.
Figure 5:
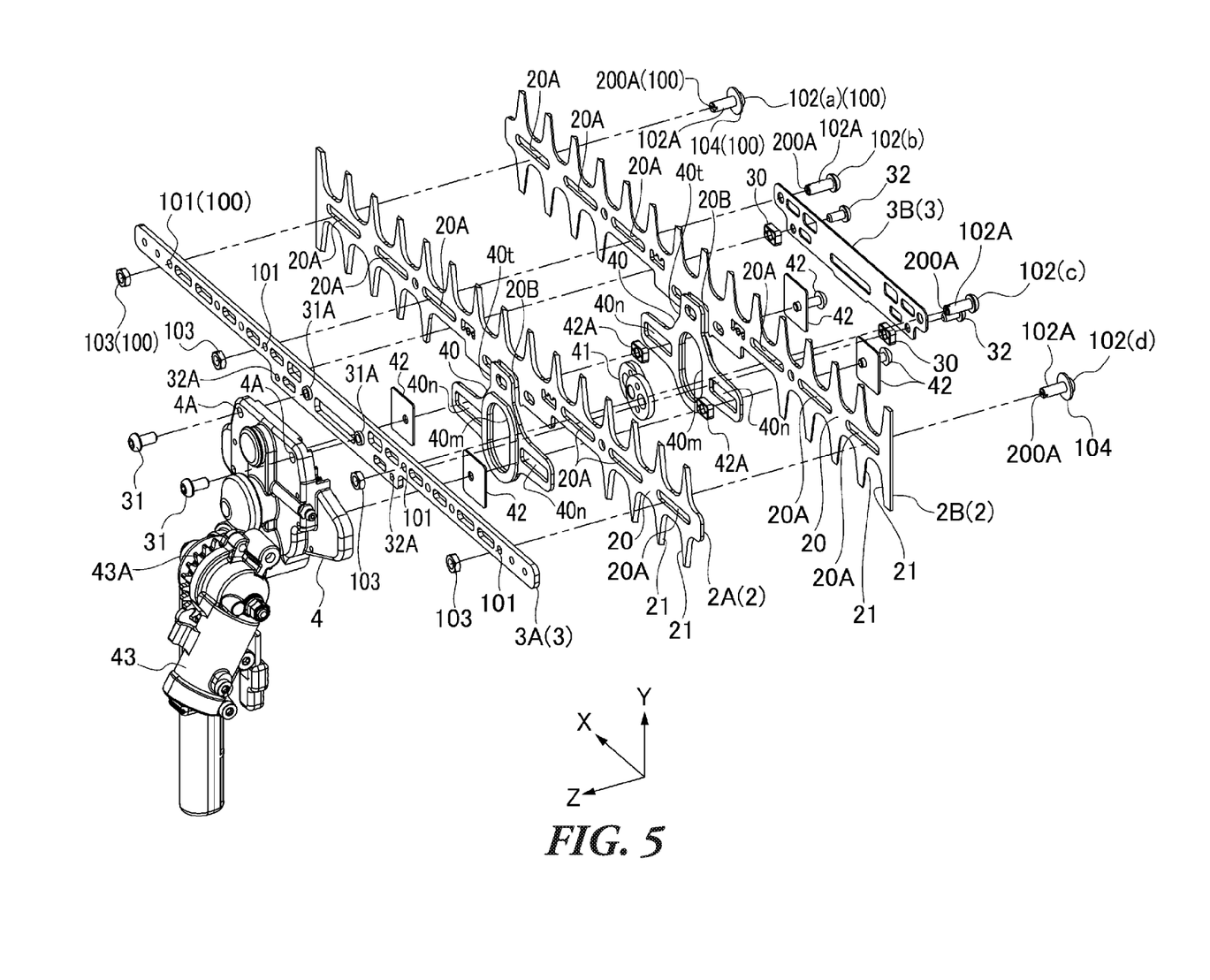
FIG. 5 is an exploded perspective view illustrating the reciprocating cutting blade apparatus according to an embodiment.

FIG. 4 and FIG. 5 illustrate the reciprocating cutting blade apparatus including the above-described adjustment mechanism according to an embodiment. Here, an example where the cutting blades are disposed in T-shape will be described, but this is by no means limiting.

The reciprocating cutting blade apparatus 1 includes a transmission case 4. The transmission case 4 includes a power train to reciprocate the cutting blades 2. The power train is configured to convert the rotation of a drive shaft (not illustrated) to reciprocating motion, and includes reciprocating members 40 (40A and 40B) such as connecting rods which are reciprocably supported in the longitudinal direction (the X direction) of the cutting blades 2, and a cam 41.

The reciprocating members 40 (40A and 40B) include joints 40t to connect to the bases 20 of the cutters 2A and 2B, respectively. Each of the joints 40t includes a convex portion protruding in the direction (the Y direction) orthogonal to the longitudinal direction of the cutting blades 2. Meanwhile, a concave portion 20B is formed in a coupled portion of the base 20 to which the above-described joint 40t (convex portion) is coupled, and the joint 40t is engaged with the concave portion 20B.

In the example illustrated, each of the reciprocating members 40 (40A and 40B) includes a fitting hole 40m in which the cam 41 is fitted, and guide holes 40n in which guide pieces 42A of guide members 42 in the transmission case 4 are fitted. The guide holes 40n are provided on the right and left sides of the fitting hole 40m along the X direction in the drawing.

The above-described support member 3 is attached to the transmission case 4, and movably supports the pair of cutting blades 2 (cutters 2A and 2B) in the longitudinal direction (the X direction), sandwiching the bases 20 of the cutting blades 2 therebetween. In the example illustrated, the support member 3 includes a pair of support plates (upper support plate 3A and lower support plate 3B) extending in the longitudinal direction (the X direction) of the cutting blades 2.

The upper support plate 3A and the lower support plate 3B of the support member 3 are fastened via spacers 30 to make a space to accommodate the pair of cutting blades 2. The upper support plate 3A and the lower support plate 3B are independently attached to the transmission case 4 while keeping the space. The pair of cutting blades 2 is accommodated in this space and detachably attached to the support member 3.

Hereinafter, the configuration where the cutting blades 2 are fastened and supported by the support member 3 will be described in detail with reference to FIG. 5. First, attachment screws 31 are screwed into screw holes 31A of the upper support plate 3A via holes 4A of the transmission case 4 to independently attach the upper support plate 3A of the support member 3 to the transmission case 4. Meanwhile, the upper support plate 3A and the lower support plate 3B are fastened by fastening screws 32 at fastening points 32A without interfering with the pair of cutting blades 2. The fastening screws 32 penetrate the holes of the lower support plate 3B and the spacers 30, and are screwed into the fastening points 32A of the upper support plate 3A. By this means, the upper support plate 3A and the lower support plate 3B are fastened while keeping the space for the thickness of the spacers 30, and attached to the transmission case 4.

Then, the pair of cutting blades 2 (cutters 2A and 2B) sandwiched between the upper support plate 3A and the lower support plate 3B is reciprocably supported by the support member 3 with the adjustment screws 102 at points different from the above-described fastening points 32A. Here, the two adjustment screws 102(a) and 102(d) of the four adjustment screws 102(a to d) are inserted into the washers 104 as described above, and screwed into the screw holes 101 of the upper support plate 3A via the long holes 20A of the pair of cutting blades 2, and fixed by the nuts 103. In addition, the other two adjustment screws 102(b) and 102(c) are inserted into the holes of the lower support plate 3B, and screwed into the screw holes 101 of the upper support plate 3A via the long holes 20A of the pair of cutting blades 2, and fixed by the nuts 103.

In this case, the distance between the washers 104 and the upper support plate 3A is adjusted by the adjustment screws 102(a) and 102(d), and therefore it is possible to adjust the distance between the two cutters 2A and 2B sandwiched between the washers 104 and the upper support plate 3A. In addition, the distance between the upper support plate 3A and the lower support plate 3B is adjusted by the adjustment screws 102(b) and 102(c), and therefore it is possible to adjust the distance between the two cutters 2A and 2B sandwiched between the upper support plate 3A and the lower support plate 3B.

The pair of cutting blades 2 is supported by the support member 3 (upper support plate 3A) with the adjustment screws 102(a to d) at the positions different from those of the screw holes 31A in which the attachment screws 31 are inserted to attach the support member 3 (upper support plate 3A) to the transmission case 4. By this means, it is possible to detach the pair of cutting blades 2 simply by removing the adjustment screws 102 (a to d) while the support member 3 remains attached to the transmission case 4.

Although there are the spacers 30 between the upper support plate 3A and the lower support plate 3B, the adjustment screws 102(b) and 102(c) are provided at positions different from the fastening points 32A at which the upper support plate 3A and the lower support plate 3B are fastened via the spacers 30. Therefore, it is possible to adjust the distance between the upper support plate 3A and the lower support plate 3B by fastening the adjustment screws 102(b) and 102(c) to elastically deform the upper support plate 3A and the lower support plate 3B.

The pair of cutting blades 2 is easily detached and attached by removing the adjustment screws 102 without taking apart the reciprocating cutting blade apparatus 1. That is, the pair of cutting blades 2 can be free from the support member 3 (the upper support plate 3A and the lower support plate 3B) simply by removing the nuts 103 from the adjustment screws 102 and also removing the adjustment screws 102 from the screw holes 101 of the upper support plate 3A to pull out the adjustment screws 102. In the example illustrated, the adjustment screws 102 are arranged in a line different from the fastening screws 32 to prevent a mistake of the screws when the pair of cutting blades 2 is detached from the reciprocating cutting blade apparatus 1.

The cutting blades 2 is coupled to the power train in the transmission case 4 simply by coupling the joints 40t of the reciprocating members 40 to the bases 20 of the cutting blades 2, more specifically, by engaging the convex portions of the joints 40t protruding in the Y direction with the concave portions 20B of the bases 20 caving in the Y direction. Therefore, it is possible to easily detach the pair of cutting blades 2 from the support member 3 by pulling out the pair of cutting blades 2 in the Y direction.

Figure 6:
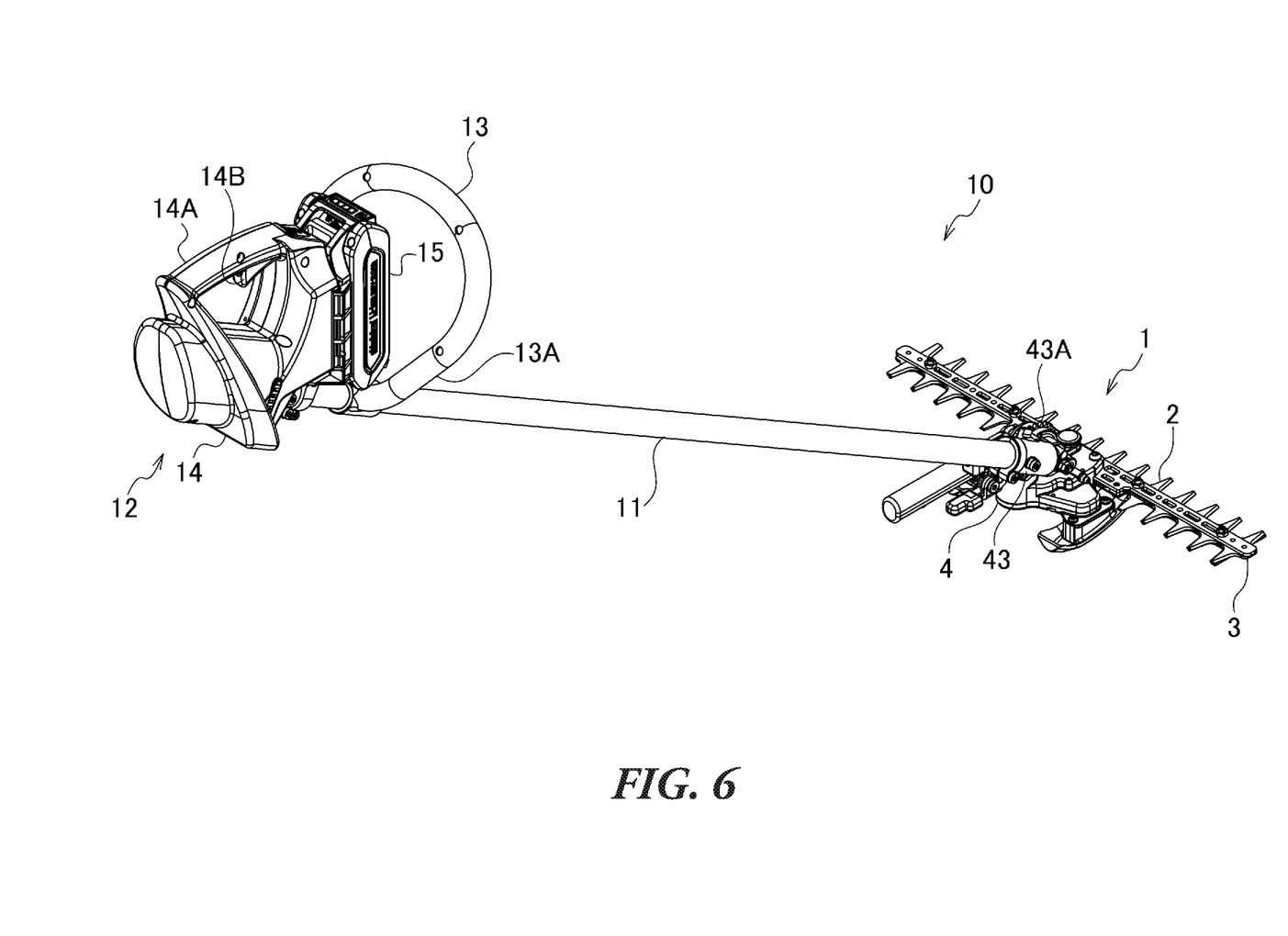
FIG. 6 illustrates an example of handheld working machine equipped with the reciprocating cutting blade apparatus.

FIG. 6 illustrates an example of handheld working machine equipped with the above-described reciprocating cutting blade apparatus 1. As illustrated, a handheld working machine 10 includes an operating rod 11, and the top end of the operating rod 11 is mounted to an operating rod mount 43 of the transmission case 4. The operating rod mount 43 is mounted to the transmission case 4 via an angle adjustment mechanism 43A. This angle adjustment mechanism 43A can adjust the rising angle of the operating rod 11 from the working surface of the cutting blades 2.

A drive shaft (not illustrated) configured to transmit a drive force to the above-described power train is provided in the operating rod 11. In addition, a drive unit 12 configured to drive the drive shaft is provided at the base end of the operating rod 11, and an operating handle 13 is provided in the base end side of the operating rod 11. The operating handle 13 includes a grip 13A above the operating rod 11.

The drive unit 12 is configured to drive the reciprocating cutting blade apparatus 1 via the drive shaft in the operating rod 11, and includes a housing 14 to accommodate a motor disposed approximately coaxially with the operating rod 11. A rear handle 14A including an operating switch 14B configured to turn on and off the reciprocating cutting blade apparatus 1 is provided in the housing 14. A battery unit 15 configured to supply electric power to the motor in the housing 14 is externally attached to the housing 14.

This handheld working machine 10 is an electric brush cutter equipped with the reciprocating cutting blade apparatus 1. The longitudinal direction of the cutting blades 2 intersects the longitudinal direction of the operating rod 11, and therefore the reciprocating cutting blade apparatus 1 is provided at the top end of the operating rod 11 to form a T-shape. This handheld working machine 10 performs brush cutting by driving the reciprocating cutting blade apparatus 1 to move the reciprocating cutting blade apparatus 1 along the ground while the worker holds the operating handle 13 and the rear handle 14A of the housing 14 by the hands to keep a predetermined rising angle of the operating rod 11 from the ground.

With this handheld working machine 10, the width of the cutting blades 2 of the reciprocating cutting blade apparatus 1 in the longitudinal direction is the effective width without shaking the operating rod 11 from side to side. Accordingly, the worker can perform the brush cutting with the effective width by simply pushing the operating rod 11 forward. Therefore, it is possible to perform the brush cutting by the reciprocating cutting blade apparatus 1 speedily moving forward, and consequently to improve the efficiency of the brush cutting. Moreover, the reciprocating cutting blades are used to perform the brush cutting, and therefore it is possible to reduce the scattering substances during the working. By this means, it is possible to ensure the safety of the worker and the surrounding of the worker, and to perform the brush cutting without damaging other people's properties near the working site.

Moreover, with the handheld working machine 10, it is possible to easily and safely adjust the gap between the pair of cutting blades 2, and consequently to improve the efficiency of the maintenance for repeated works.

As described above, the embodiments of the present invention have been described in detail with reference to the drawings. However, the specific configuration is not limited to the embodiments, and the design can be changed without departing from the scope of the present invention. In addition, the above-described embodiments can be combined by utilizing each other's technology as long as there is no particular contradiction or problem in the purpose and configuration.

According to the invention, the gap can be adjusted by loosening the nuts threadedly engaged with the external threads protruding from the upper surface of the support member, and operating the operated portions provided in the external threads by using a tool to turn the adjustment screws. In addition, the external threads of the adjustment screws can be fixed to the support member by fastening the nuts threadedly engaged with the external threads on the upper surface side of the support member. By this means, it is possible to adjust the gap between the reciprocating cutting blades by only the operation on the upper side of the support member, and therefore to safely and easily adjust the gap between the two reciprocating cutting blades.

The invention claimed is:

1. A reciprocating cutting blade apparatus comprising:
a pair of reciprocating cutting blades disposed to overlap one another in a thickness direction;
a support member configured to reciprocably support the reciprocating cutting blades in a longitudinal direction; and
an adjustment mechanism configured to adjust a gap between the reciprocating cutting blades on a lower surface side of the support member,
the adjustment mechanism including:
a screw hole provided in the support member;
an adjustment screw including an externally threaded portion that protrudes from the upper surface of the support member and that is configured to threadedly engage with the screw hole through long holes provided in the reciprocating cutting blades; and
a nut configured to threadedly engage with the externally threaded portion of the adjustment screw protruding from an upper surface of the support member to fix the external thread to the support member,
wherein the externally threaded portion protruding from the upper surface of the support member includes an operated portion configured to be operated to turn the adjustment screw, and
wherein the operated portion is a slotted portion provided in a top portion of the externally threaded portion of the adjustment screw.

2. The reciprocating cutting blade apparatus according to claim 1, further comprising a transmission case to which the support member is independently attached,
wherein the reciprocating cutting blades can be removed from the support member remaining attached to the transmission case by removing the adjustment screw.

3. A reciprocating cutting blade apparatus comprising:
a pair of reciprocating cutting blades disposed to overlap one another in a thickness direction;
a support member configured to reciprocably support the reciprocating cutting blades in a longitudinal direction; and
an adjustment mechanism configured to adjust a gap between the reciprocating cutting blades on a lower surface side of the support member; and
a transmission case to which the support member is independently attached,
wherein the adjustment mechanism includes:
a screw hole provided in the support member;
an adjustment screw including an externally threaded portion configured to protrude from an upper surface of the support member and threadedly engage with the screw hole through long holes provided in the reciprocating cutting blades; and
a nut configured to threadedly engage with the externally threaded portion protruding from an upper surface of the support member to fix the external thread to the support member,
wherein the external thread protruding from the upper surface of the support member includes an operated portion configured to be operated to turn the adjustment screw, and wherein the reciprocating cutting blades can be removed from the support member independently attached to the transmission case by removing the adjustment screw.

4. The reciprocating cutting blade apparatus according to claim 3, wherein the operated portion is a slotted portion provided in a top portion of the externally threaded portion.

5. The reciprocating cutting blade apparatus according to claim 3, wherein the operated portion is a hole provided in an upper end portion of the externally threaded portion.

\* \* \* \* \*